United States Patent [19]

Nuytkens et al.

[11] Patent Number: 4,933,890
[45] Date of Patent: Jun. 12, 1990

[54] DIGITAL FREQUENCY SYNTHESIZER

[75] Inventors: Peter Nuytkens, Watertown; Paul Van Broekhoven, Needham, both of Mass.

[73] Assignee: The Charles Stark Draper Laboratory, Inc., Cambridge, Mass.

[21] Appl. No.: 365,668

[22] Filed: Jun. 13, 1989

[51] Int. Cl.$^5$ ............................................. G06F 1/02
[52] U.S. Cl. ...................................... 364/721; 364/701
[58] Field of Search ............... 364/701, 703, 717, 721; 328/14

[56] References Cited

U.S. PATENT DOCUMENTS

| | | | |
|---|---|---|---|
| 4,410,954 | 10/1983 | Wheatley et al. | 364/701 |
| 4,476,536 | 10/1984 | Jones, Jr. | 364/721 |
| 4,559,613 | 12/1985 | Murphy et al. | 364/703 |
| 4,652,832 | 3/1987 | Jasper | 364/721 X |
| 4,835,721 | 5/1989 | Becker et al. | 364/717 |

Primary Examiner—Gary V. Harkcom
Assistant Examiner—Tan V. Mai
Attorney, Agent, or Firm—Lahive & Cockfield

[57] ABSTRACT

The edge timing of a clock-synthesized numerically controlled oscillator (NCO) waveform of a desired frequency is corrected to coincide more precisely with that of an ideal waveform of the desired frequency by providing an NCO output signal to a controllable delay line, determining from the NCO output signal an offset time of the NCO clock signal from that of the ideal waveform, and controlling delay of the delay line so that the output signal has an edge substantially coincident with the ideal waveform. Using delays which are small fractions of a system clock interval, direct digital synthesis of frequencies near the clock frequency is achieved. Preferably, the delay is performed with a tapped delay line, which may be implemented as a chain of transistors in a monolithic device. In a preferred embodiment, remaining periodic phase variations are further suppressed by randomizing the tap selection sufficiently to suppress sideband spurs. This may be accomplished by selecting two or more adjacent tap delays and using a random sequence generator to control an early/late tap selection switch. Fabrication of a gigahertz range direct digital synthesizer is described.

24 Claims, 4 Drawing Sheets

DIGITAL FREQUENCY SYNTHESIZER

BACKGROUND OF THE INVENTION

The present invention relates to digital frequency synthesis, and more particularly to apparatus for correcting the phase of a digitally-synthesized waveform.

Digital waveform synthesis is commonly performed by a numerically controlled oscillator (NCO) comprising an adder and a hold register coupled as an accumulator of fixed size, by incrementing the accumulator with a fixed generator number K at each clock pulse. The number K, denoted the phase increment or frequency vector, is selected such that the accumulator overflows with a period corresponding to the desired synthesized frequency. Except for a synthesized frequency which is a power-of-two submultiple of the clock frequency, however, accumulator overflow will occur at a clock pulse which is offset in time from the precise time of zero crossing, or the leading edge, of the ideal waveform.

Thus, such a numerically controlled oscillator produces a ramp waveform, and the least value and the greatest value of the ramp are each offset from 0 or the accumulator size $2^N$ by a periodically varying number which is less than the phase increment K. More precisely, for phase increments not equal to $2^n$, where $n<N$, the NCO behaves like a fractional divider with a sequence of non-uniform periods that repeat in a periodic pattern and whose average is the desired synthesized period.

This periodic phase modulation creates undesirable sidebands. For NCOs of the above-described type, one approach in the prior art to eliminating these sidebands has been to employ a high number of amplitude quantization states for the accumulator ramp waveform, and to map the values of the ramp function to a set of corresponding sinusoidal waveform values, by a technique such as using a look-up table. The digital sinusoidal values are then D/A converted, and passed to an analog smoothing element to develop a smoothly varying output waveform. Conventional detection circuitry then interpolates or detects the zero crossings of the converted waveform. This approach, however, is limited by the D/A converter bandwidth.

Another approach to eliminating the sidebands in an NCO-generated waveform has been to employ a high number of amplitude quantization states and to vary the clock phase by addition of a zero mean random clock phase dither. See, for example, U.S. Pat. No. 4,410,954 of C. E. Wheatley, III. This approach is effective only for synthesized frequencies which are several orders of magnitude less than the system clock.

It is desirable to provide a digital frequency synthesizer which provides greater signal fidelity over a broader bandwidth by reducing the power of the sideband frequencies inherently associated with digital waveform synthesis.

SUMMARY AND OBJECTS OF THE INVENTION

It is an object of the invention to provide direct digital frequency synthesis with low sideband spur power.

It is another object of the invention to provide a wide bandwidth digital frequency synthesizer of simple construction.

It is another object of the invention to provide a digital frequency synthesizer which synthesizes with faithful edge timing a frequency near the system clock frequency.

It is another object of the invention to provide a digital frequency synthesizer having a bandwidth which is not limited by analog processing elements.

These and other desirable features are obtained in various embodiments of a direct digital frequency synthesizer according to the invention, in which an NCO successively increments a function value by a generator word K at each clock pulse, up to a set threshold value, so that a level of the accumulator overflows with a remainder less than K at a period approximating that of the desired waveform. With each overflow, a controllable delay element delays the output by a fraction of a clock interval to correct the phase of the output signal.

In a basic embodiment of the invention, when the function value is near the overflow value, its most significant bit (MSB) is fed as a rough output signal to a delay line and its least significant bits (LSBs) are decoded to control the delay. The MSB is reclocked or delayed by less than one clock interval to correct its Phase error, resulting in a phase corrected square wave of the desired frequency. In one embodiment, the delay is effected by a tapped delay line having 4, 8 or more taps defining successive incremental delays. Preferably, the total delay of the delay line is phase locked to the clock interval, so that each tap represents a fixed fraction thereof. The LSB is processed, by arithmetical computation or by a table look up, to determine the tap corresponding to a zero phase angle. In a further preferred embodiment, means are provided for randomizing the selection of a delay line tap within a small interval to spread the remaining side band energy and further reduce spurs.

BRIEF DESCRIPTIONS OF THE DRAWINGS

These and other features of the invention will be understood in part from the following disclosure, with reference to the drawings, wherein FIG. 1 shows a prior art numerically controlled oscillator;

DESCRIPTION OF ILLUSTRATED EMBODIMENTS

Figure 1:
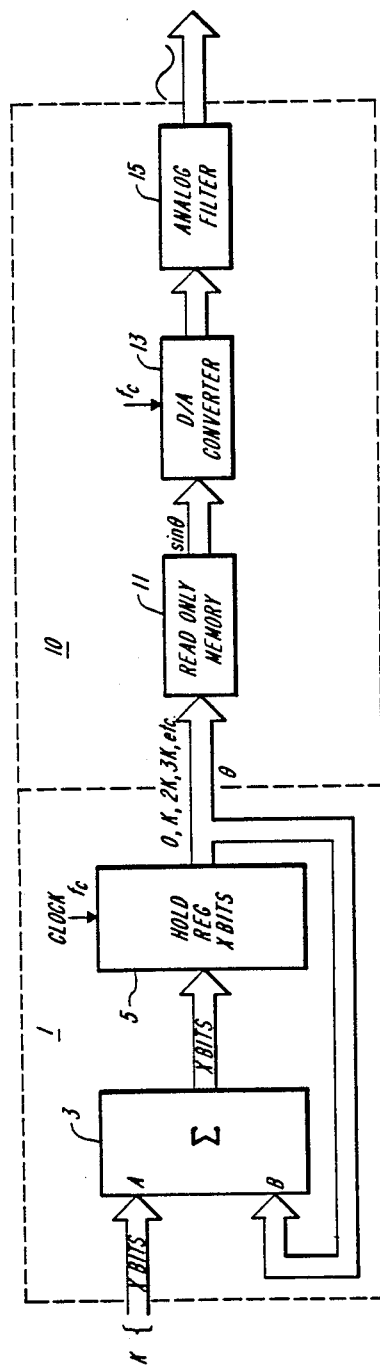
Figure 2:
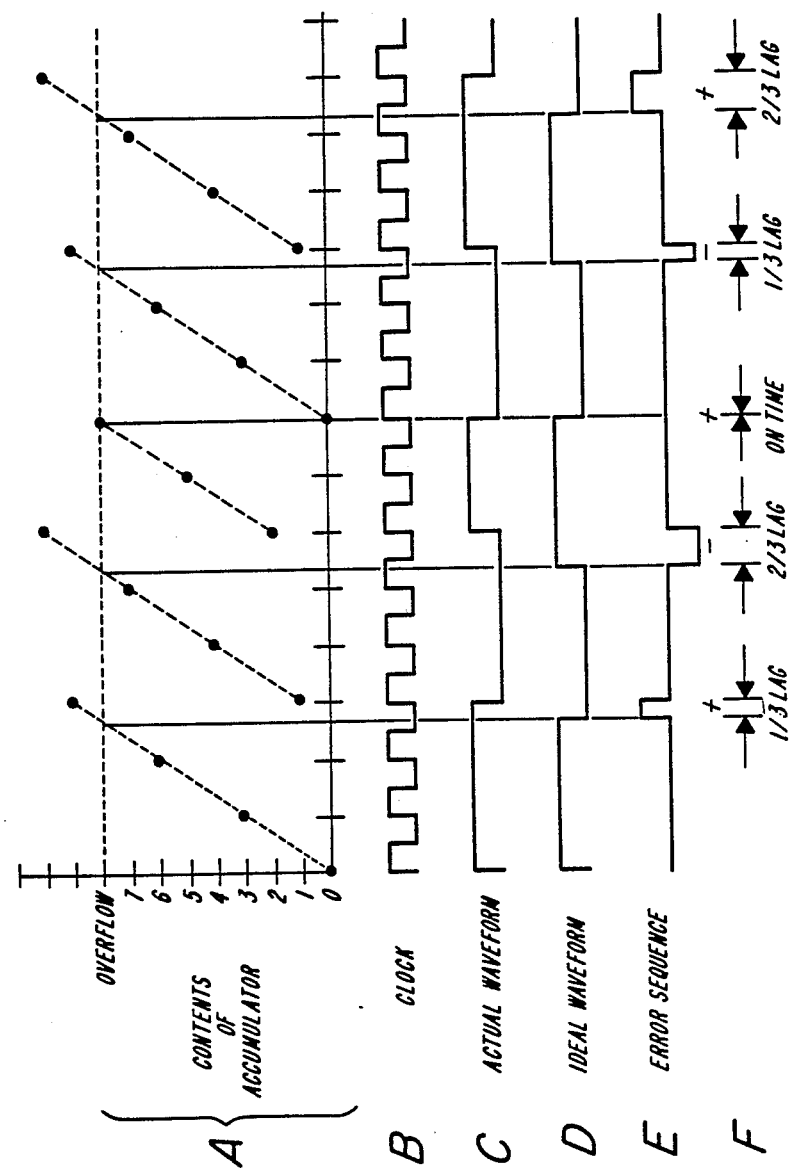
FIG. 2 shows the waveforms and phase errors generated by the device of FIG. 1.

Before describing in detail a basic embodiment of the invention and various further improvements thereof, a brief description is made of the prior art NCOs as illustrated in FIGS. 1 and 2, in order to familiarize the reader with the elements and limitations thereof.

FIG. 1 shows the basic logic building blocks of such an NCO 1, comprising an adder 3 and a hold register 5. Numbers at the output of the hold register 5 are fed to one input of the adder 3, while an externally programmed number K is fed to the other input of the adder. The number K is a constant which determines the selected accumulator overflow frequency. At each counting edge of a clock pulse of the system clock signal $f_c$, the sum of the two adder inputs is transferred to the hold register output, and the process repeats. The circuit therefore is essentially a counter that counts from zero to its maximum value in increments of K until it overflows and starts over, producing a quasi-periodic ramp function in which the highest value before overflow, and the lowest value after overflow, may vary in each cycle. If the maximum value of the digital word in the hold register is scaled to equal 360 degrees, the values in the register may be thought of as representing an angle $\theta$ between 0 and 360 degrees; the incremental addition of the generator number K thus corresponds to incrementing the angle $\theta$.

One conventional way of converting the digital ramp output values of NCO 1 to a well-defined sinusoidal waveform is by adding a processor which replaces the ramp values $\theta$ with the corresponding values $\sin \theta$, and which performs digital to analog conversion to provide a sine wave output. Such an additional processor 10 is shown in FIG. 1, wherein a $\theta$ value from the NCO passes to a read only memory 11 which stores corresponding digital $\sin \theta$ values as a look up table. The digital $\sin \theta$ values pass to a digital to analog converter 13 which converts the successively clocked values of $\sin \theta$ to analog voltage signals. The analog signals are smoothed by an analog filter element 15, resulting in a continuous sine wave output. In this manner, the discontinuity and the loss of phase information when the register overflows are converted to a smoothly varying sine signal, with a well-defined zero crossing.

As used herein, the term NCO refers to the basic adder and hold register unit functioning as an accumulator to produce the fundamental digital ramp function. Such a unit is also commonly called a digital integrator, a digital accumulator or a phase accumulator. The term direct digital synthesizer (DDS) will be used to refer to an NCO plus any additional circuitry, such as processor 10, necessary for a complete frequency synthesis.

By way of further illustration of prior art NCO characteristics, FIG. 2 shows the ramp function produced by an NCO which increments a three-bit accumulator with a binary generator number 011. Line A shows the accumulated value which, at eight successive clock cycles, is 0,3,6,1,4,7,2,5, and 8(=0), repeating periodically thereafter. These data points define a digital sawtooth function comprised of a succession of digital ramps, each ramp commencing at an overflow time of the accumulator.

Line B shows the system clock signal which is a succession of clock pulses. Line C shows the square wave produced by switching between [0,1]voltage states at the commencement of each ramp. Although this occurs at a nominal interval of 8/3 of the clock period, it will be observed that since the actual transition is constrained to coincide with the clock signal, successive waves have different edge timing. Line D shows, by way of comparison, an ideal waveform corresponding to the generator quantity K=011. Line E shows the timing discrepancy between the edge of the actual synthesized wave of Line C and the edge of the ideal wave of line D. As shown, this timing error is a fraction of a clock interval ($\frac{1}{3}$, $\frac{2}{3}$ or 0) which varies in a periodic manner. Line F shows the absolute error as a fraction of the clock interval.

This resultant phase error becomes quite large as the synthesized frequency approaches the clock frequency $f_c$, and this effect limits the bandwidth of an NCO to approximately an order of magnitude less than the clock frequency.

This problem is overcome in the present invention by providing an edge correction of the synthesized waveform which has a finer time resolution than the clock interval.

Figure 3:
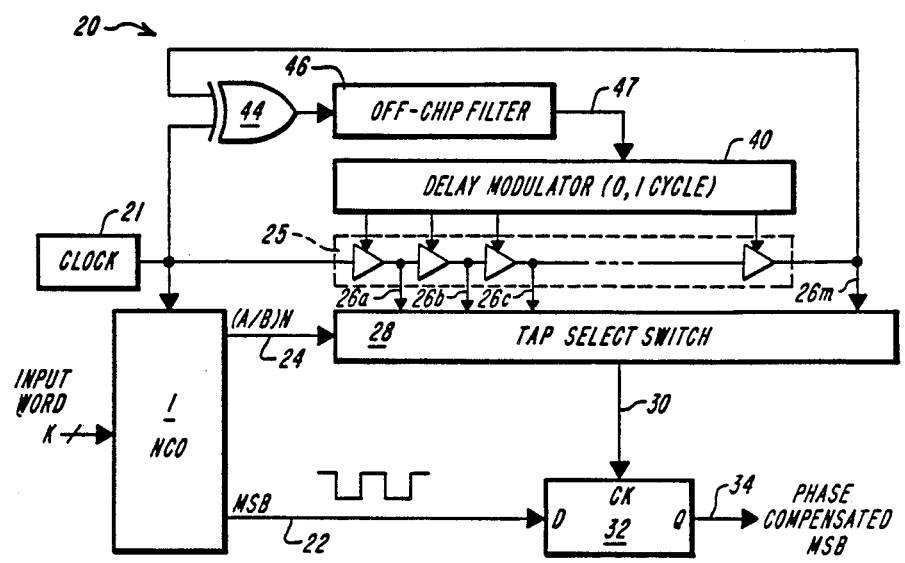
FIG. 3 is a basic diagram of a frequency synthesizer according to the present invention.

FIG. 3 shows a diagram of one embodiment 20 of the invention, in which the edge of the most significant bit (MSB) of the NCO output is reclocked to provide a phase compensated MSB. In this embodiment, an NCO 1 operates under control of a clock 21 to provide an output word comprising a most significant bit MSB provided on line 22 and plurality of less significant bits LSB provided on line 24. Clock 21 is also connected to a tapped delay line 25 having a plurality of output taps 26a, 26b, ... 26m each of which is incrementally delayed with respect to preceding tap by a fractional clock interval. The LSB signal on line 24, which corresponds to the overflow remainder R so that R/K is proportional to the timing edge error of the ramp, passes to a tap selection switch 28 which selects an output tap 26i having a time delay equal to $(R/K)t_c$, where $t_c$ is the clock interval. This causes the clock pulse to appear at line 30 after a delay of $(1+R/K)t_c$. Meanwhile, the MSB on line 22 is provided as a rough output signal to latch 32, so that it is clocked out by the delayed clock pulse on line 30, thus producing a phase compensated output on line 34. This phase compensated output defines the edge of the synthesized waveform, resulting in a square wave of the desired frequency having an edge which coincides, within one tap delay interval, with that of the ideal waveform.

As further shown in FIG. 3, the circuit preferably includes a delay modulator 40 which controls the total delay of delay line 25 to be one clock interval. A feedback loop 42 connects the final delay line output to an EX-OR detector 44 which receives the clock signal at its other input. The output of the EX-OR detector is fed to an off-chip filter 46 which sums the cumulative phase difference between the system clock and the final tap to produce a control signal which is provided along line 47 to the delay modulator for maintaining the total delay line interval equal to one clock period. This assures that in the event of temperature induced variation in the delay characteristics, the delay at each tap remains a fixed fraction of a clock interval, and the phase of the synthesized waveform remains accurate within $(1/m)t_c$, where m is the number of taps in the delay line.

Other articular constructions for accurately controlling the delay will be discussed further below, in connection with the description of fabrication of a novel monolithic delay line suitable for integral manufacture with an NCO chip in gallium arsenide or other FET fabrication technology. Before describing such particular constructions, however, a further aspect of the invention is illustrated with reference to FIG. 4.

As described above, the invention corrects edge timing of an NCO output signal by introducing a delay using a controllable delay element having a resolution which is a small fraction of the clock interval. This results in the synthesis of a square wave with great fidelity, even at frequencies approaching the clock frequency. Circuits embodying the invention may be implemented for the synthesis of very high, e.g., gigahertz, frequencies. However, the phase correction is still performed entirely deterministically by a finite state device, namely the arithmetic or logic element which selects an $i^{th}$ tap corresponding to the LSB remainder value. For this reason, there remain periodic variations in timing which, in the frequency domain, cause sideband spurs which may impair the usefulness of the synthesized frequency signal.

According to a further aspect of the invention, these discrete sideband spurs are spread or eliminated by randomizing the selection of the phase-correcting delay interval. In a preferred embodiment, this is accomplished by forming a random tap selection signal which determines the selection of one of a plurality of output taps. Each of the group of possible selection signals provides an approximately correct clock delay.

Figure 4:
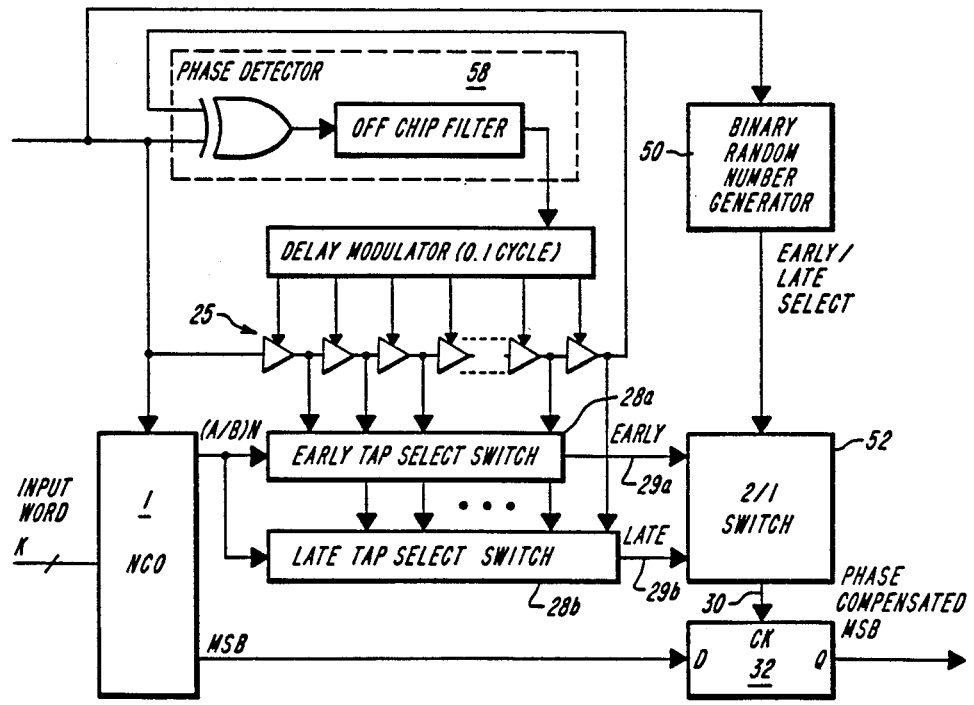
FIG. 4 shows a further embodiment with an edge error decorelator.

Such a construction for introducing a random delay is shown in FIG. 4. In this embodiment, as in FIG. 3, the clock pulse passes to a delay line 25 to provide a delayed clock on line 30 for clocking out the NCO output MSB at a time offset from the normal clock. The remainder bits A/B are used to select the output delay. In this embodiment, however, the remainder bits are applied to a two-tap selector gate 28a, 28b, which decodes the remainder to select two adjacent output taps, one of which provides a delay slightly early of the exact phase correction and the other of which provides a delay slightly late. The selected taps have the two delays closest to the calculated desired phase correction. The two selected delayed clock pulses from the selected early and late taps appear on lines 29a, 29b, respectively, connected to a two-to-one switch 52.

A digital random number generator 50 generates a pseudorandom binary number, which is clocked out and passes to the two-to-one switch 52 as a control signal to select one of the two delayed clock pulses in a random manner. The selected signal passes as a phase-corrected signal on line 30 to flip-flop 32, causing the output of a phase-corrected MSB signal, thus providing a square wave having an edge which is accurately formed to within one tap delay interval $\Delta T$, and further having edge timing errors which are randomized within an interval of approximately $\Delta T$. The resultant timing error is of a magnitude and distribution sufficient to spread the energy of the aforementioned undesired frequency spurs. As with the embodiment of FIG. 3, a feedback loop 58 preferably locks the total delay of the delay line to the clock period, so that different environmentally-induced shifts in clock frequency and delay line timing do not result in hunting.

The technology for generating a binary random number, or more precisely a pseudorandom number, is well known in radio communications circuitry, and will not be described in detail. It suffices to say that generator 50 preferably produces a maximal length PN code sequence, where the length is selected to achieve a desired level of sideband suppression, taking into account that the number of delay line taps determines as an initial matter the base level of the spur energy. From the information-theoretic considerations, it follows that the spur energy level will be suppressed below that of the synthesized frequency by an amount proportional to $\log_2$ (number of delay line taps), plus $10(\log L)$ where L is the length of the PN sequency. Specifically, correction of the phase using 2, 4, 8 or 16 - tap delay line may be expected to reduce the level of sideband spurs by 6, 12, 18 or 24 dB, respectively, so the size of the PN generator is preferably selected to achieve at least a further 27 dB of suppression to result in a total sideband suppression of 50 dB or more. This is achieved, for example, by using a Mezzemer prime number $2^{31}-1$ to generate the maximal length sequence, yielding a suppression of $\log_{10}(2^{31}-1) = 90$ dBHz over the integration bandwidth. Using a nanosecond generator clock with a nine tap shift register, a 511 length sequence would thus provide an additional 27 dB of suppression over a 2 MHz bandwidth. This figure is adequate for intended frequency synthesis applications.

It will be understood that the effect of randomizing the tap selection in the manner described above is to reduce the energy of discrete sideband spurs, while generally spreading the spur energy so as to raise the overall noise level. Thus, the invention is of particular utility where a noisier floor may be tolerated, or where the frequency synthesis is expected to vary in a dynamic environment and the expected spurs cannot be readily anticipated or suitable filters provided in advance.

Figure 5:
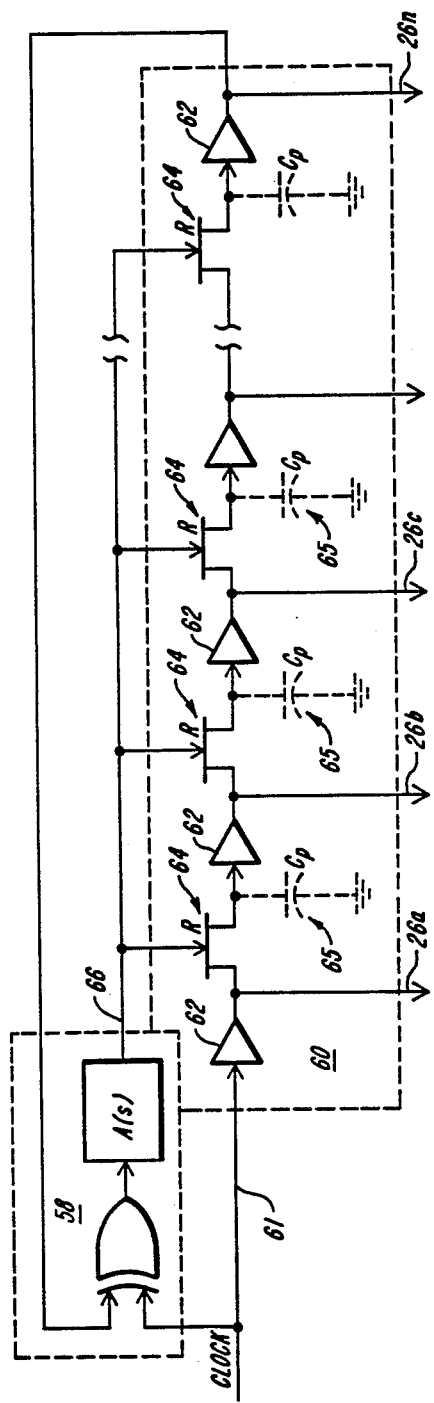
FIG. 5 shows a presently preferred delay line embodiment for high-frequency synthesis.

Returning now to a discussion of the delay element used for edge correction, FIG. 5 illustrates the implementation of a preferred embodiment of a controllable delay line according to the inventions, which is fabricated as a monolithic structure so as to inherently provide substantial uniformity of successive delay intervals of the different cells of the line.

As shown, delay line 60 includes a chain of amplifiers 62 and field effect transistors 64. A clock pulse is applied to line 61, and passes successively along the chain, with output delay taps 26a, 26b etc. at each stage.

For purposes of illustration, a capacitor 65 is drawn in phantom at each stage, representative of the parasitic capacitance of the circuit stage. As in the circuit embodiments of FIGS. 3 and 4, a phase feedback loop 58 provides a control signal, which in this case is a voltage applied to the delay line along line 66. The voltage on line 66 is applied to the gate of each FET 64. Because of the linear resistivity characteristics of these elements, the effect of a voltage change on line 66 is to vary the R-C network comprised of the transistor 64 and the local parasitic capacitance 65, so that the rise time of the input clock signal is delayed as the signal propagates past each stage. This delay is essentially proportional to the applied voltage on line 66, so that very simple yet precise control of the total delay is achieved by the phase locking loop 58.

In a representative prototype design, a delay line consisting of eight cells, each having a theoretically-calculated delay in the range of 105-140 picoseconds, was designed as a gallium arsenide chip. Such a delay line, in conjunction with the circuit architecture of FIGS. 3 or 4, would effect digital synthesis of frequencies above one gigahertz. Moreover, since all the components of the NCO, tap selection, and random number generation described in FIGS. 3 and 4 may be implemented in a straightforward manner in gallium arsenide logic, the entire circuit may be fabricated as a single chip. More generally, such a delay line may be fabricated in any existing technology for making field effect transistors, and integrated accordingly with the other components of a frequency synthesizer.

This completes a description of the illustrated embodiments of the invention which, it will be appreciated, have been presented by way of explanation only, and are not intended to limit the scope of the invention. These embodiments being thus described, numerous variations and modifications will occur to those skilled in the field, and all such variations and modifications are within the scope of the invention, as defined by the claims appended hereto.

What is claimed is:

1. An improved digital frequency synthesizing device of the type for synthesizing a waveform of a desired frequency, and comprising an accumulator arranged so that at successive clock pulses having a clock interval $t_c$ the contents of the accumulator are incremented by a generating quantity K, where K is selected such that a level, of the accumulator overflows with a period within $t_c$ of the period of the desired frequency, wherein the improvement comprises an n-tap delay line having an input line and plural output taps $T_i$, each output tap $T_i$ successively delayed with respect to a preceding tap $T_{i-1}$ by a tap delay interval less than said clock interval $t_c$, said delay line being interconnected so as to receive at its input a signal synchronized with a clock pulse and to provide correspondingly delayed output signals $O_i$ at respective output taps $T_i$, selection signal means interconnected to receive a signal representative of said accumulator contents and to develop a tap selection signal in accordance therewith, and tap selection means in electrical communication with said n-tap delay line and responsive to said selection signal for selecting an output tap $T_i$ such that the output signal $O_i$ is provided at said selected output tap $T_i$ at a delayed time corresponding to an edge of said desired waveform thereby providing a synthesized waveform in phase with the desired waveform.

2. The improved device of claim 1, wherein the tap delay interval is small compared to the clock interval.

3. The improved device of claim 2, wherein said tap selection means comprises means for selecting a pair of successive output taps $T_i$, $T_{i+1}$ having output delay times adjacent to said edge, and means for randomly selecting the output signal at one tap of said pair of output taps thereby decorrelating edge errors and reducing sidebands of the synthesized waveform.

4. The improved device of claim 2, further comprising feedback means for controlling total delay of said n-tap delay line to be equal to the clock interval.

5. The improved device of claim 4, wherein the tapped delay line is formed as a chain of transistors.

6. The improved device of claim 5, wherein said tap selection means comprises means for determining a pair of output taps $T_i$, $T_{i+1}$ having output delay times located within one tap delay interval of said desired waveform edge, and means for randomly selecting one tap of said pair.

7. The improved device of claim 6, wherein the means for randomly selecting one tap comprises a maximal length code generator for generating a PN code, and wherein said PN code is determinative of said tap selection.

8. The improved device of claim 5, wherein the device is fabricated as a GaAs chip.

9. An improved digital frequency synthesizer of the type for synthesizing an output wave of a desired frequency by incrementing at successive clock intervals $t_c$ the contents of an accumulator by a digital generator word K selected so that the contents of the accumulator comprise at successive times a sequence of words $\alpha$, $\alpha+K$, $\alpha+2K\ldots$, the generator word K being selected such that a level of the accumulator overflows with a remainder word c, corresponding to a phase error between such overflow and the period of a wave of the desired frequency, wherein the improvement comprises means for shifting the edge of an output word of said accumulator by a time interval which corrects the phase error.

10. The improved synthesizer of claim 9, wherein the means for shifting includes a tapped delay line.

11. The improved synthesizer of claim 10, wherein the means for shifting includes means for determining at random one tap from among two adjacent taps of said delay line each having a delay approximately equal to $(K-c/K) t_c$.

12. The improved synthesizer of claim 11, further comprising feedback means for synchronizing the total delay of the tapped delay line with the clock interval.

13. In a numerically controlled oscillator for synthesizing a waveform of selected frequency in which a phase increment K is repetitively supplied to an accumulator which provides an output signal at said selected frequency, said accumulator having an adder responsive to said phase increment K and an accumulating register having an overflow output and receiving an input from said adder, with a periodicity of said output signal corresponding to the periodic overflow of a level of said register at an average frequency corresponding to said selected frequency, the improvement comprising control means responsive to the contents of said accumulator for determining a delay signal indicative of a phase offset of said output signal from an ideal wave of the selected frequency, and delay means responsive to said delay signal for delaying the output signal by said phase offset, so as to produce a phase corrected signal.

14. The improvement of claim 13, wherein said delay means comprises a tapped delay line and wherein said delay signal is a tap selection signal.

15. The improvement of claim 14, further comprising means for reducing discrete spectral spurs in said phase corrected signal by combining a random signal with said tap selection signal to randomize the selection of a delay line tap by an amount sufficient to reduce said spurs.

16. The improvement of claim 15, further comprising means for synchronizing the total delay of said tapped delay line with a system clock interval.

17. A method of correcting the edge timing of a clock-synthesized numerically controlled oscillator (NCO) wave form of a desired frequency so that said timing coincides more precisely with the zero crossing of an ideal waveform of the desired frequency, such method comprising the steps of providing an NCO output signal to a controllable delay line, determining from said NCO output signal an offset time of the NCO clock signal from said ideal waveform zero crossing, and controlling delay of said delay line so that said output signal is delayed by said offset time to produce a delayed signal having a corrected edge coincident with said ideal waveform zero crossing.

18. The method of claim 17, wherein the delay line is a tapped delay line, and wherein the step of controlling the delay includes the step of selecting an output tap so as to provide said offset.

19. The method of claim 18, wherein the step of controlling the delay further includes the step of controlling the total delay of said delay line to span the interval between successive clock signals.

20. The method of claim 18, wherein the step of selecting comprises the step of randomly selecting one output tap among plural output taps each having a delay approximately equal to said offset time.

21. The method of claim 17, wherein the delay line is fabricated as a chain of transistors on a monolithic substrate, so as to have uniform tap delay intervals of controllable duration.

22. The method of claim 17, wherein the step of controlling delay includes the step of randomizing the delay by an amount sufficient to suppress discrete sideband spurs.

23. An improved digital frequency generator of the type comprising a digital integrator which is augmented at successive clock intervals $t_c$ by a generator quantity k to produce an overflow signal and thereby periodically to generate an output signal having an edge synchronized with a clock signal, wherein the improvement further comprises delay means for delaying the output signal by a plurality of discrete intervals less than the clock interval, and decoding means for decoding the overflow signal to determine a delay selection signal, said delay selection signal being provided to the delay means for selecting a said discrete interval which is effective to correct a phase error of said output signal.

24. The improved digital frequency generator of claim 23, further comprising means for randomizing said delay selection signal by an amount effective to suppress sidebands of the generated waveform.

* * * * *